(12) United States Patent
Tokushima

(10) Patent No.: US 8,094,978 B2
(45) Date of Patent: Jan. 10, 2012

(54) POLARIZATION ROTATOR AND METHOD FOR MANUFACTURING THE SAME

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 12/517,099

(22) PCT Filed: Nov. 30, 2007

(86) PCT No.: PCT/JP2007/073194
§ 371 (c)(1),
(2), (4) Date: Jun. 1, 2009

(87) PCT Pub. No.: WO2008/066159
PCT Pub. Date: Jun. 5, 2008

(65) Prior Publication Data
US 2010/0002989 A1    Jan. 7, 2010

(30) Foreign Application Priority Data
Dec. 1, 2006 (JP) .................. 2006-325730

(51) Int. Cl.
*G02B 6/12* (2006.01)
*G02B 6/14* (2006.01)

(52) U.S. Cl. ............. 385/14; 385/28; 385/146; 385/11; 385/43; 385/131

(58) Field of Classification Search .............. 385/146, 385/115, 116, 120, 121, 133, 131, 132, 902, 385/11, 43, 14, 27, 28, 29, 123, 124, 129, 130
See application file for complete search history.

(56) References Cited

U.S. PATENT DOCUMENTS

| | | | | |
|---|---|---|---|---|
| 5,410,625 A | * | 4/1995 | Jenkins et al. | 385/28 |
| 6,396,984 B1 | * | 5/2002 | Cho et al. | 385/43 |
| 7,228,015 B2 | * | 6/2007 | Watts et al. | 385/11 |
| 2006/0018584 A1 | * | 1/2006 | Watts et al. | 385/11 |
| 2009/0245728 A1 | * | 10/2009 | Cherchi et al. | 385/28 |
| 2010/0002989 A1 | * | 1/2010 | Tokushima | 385/14 |

FOREIGN PATENT DOCUMENTS

| | | |
|---|---|---|
| JP | 1986190307 A | 8/1986 |
| JP | 1988064018 A | 3/1988 |
| JP | 2003167140 A | 6/2003 |
| JP | 2006509264 A | 3/2006 |
| WO | 2004042458 A | 5/2004 |

OTHER PUBLICATIONS

International Search Report for PCT/JP2007/073194 mailed Dec. 25, 2007.

* cited by examiner

*Primary Examiner* — Brian Healy

(57) ABSTRACT

An optical circuit comprises: a first waveguide; a second waveguide: and a third waveguide that converts mode field and direction of polarization of light of said first waveguide at the same time to perform wave guiding to said second waveguide: wherein large aspect ratio directions of corresponding ends of a core of said first waveguide and a core of said second waveguide differ from each other.

8 Claims, 5 Drawing Sheets

POLARIZATION ROTATOR AND METHOD FOR MANUFACTURING THE SAME

TECHNICAL FIELD

This application is the National Phase of PCT/JP2007/073194, filed Nov. 30, 2007, which is based upon and claims the benefit of the priority of an earlier Japanese Patent Application No. 2006-325730, filed on Dec. 1, 2006, the disclosure of which is incorporated herein in its entirety by reference thereto.

The present invention relates to a polarization rotator and a method for manufacturing the same, and in particular, to a polarization rotator for an optical circuit and a method for manufacturing the same. Furthermore, the present invention relates to a TE-TM mode converter that includes a polarization rotator, an optical circuit, and methods for manufacturing these.

BACKGROUND ART

A silicon-on-insulator (SOI) substrate is a silicon substrate on which a silicon dioxide thin film, referred to as a buried oxide film, is formed, and in addition, a silicon thin film, referred to as a silicon active layer, is formed thereon. The SOI can be used as a substrate of an optical circuit; by etching the silicon active layer, which is the uppermost layer, into a wire shape, it is possible to form a wire waveguide that has a wire-shaped silicon as a core and has both an underlying buried-oxide film and overlying air as cladding surrounding the core. The over-cladding over the core may additionally be substituted by silicon dioxide. (While light is guide along the waveguide, electromagnetic field of the light is distributed so as to penetrate into the cladding from the core as a center. Therefore, the "waveguide" includes not only the core but also the cladding, and the "wire" refers to only the core of the waveguide. In addition "core width" refers to a distance between lateral sides of the core in a cross-section perpendicular to a direction of wave-guiding, and "core height" refers to a distance between a top and bottom faces of the core in a cross-section perpendicular to the direction of wave-guiding. A similar situation applies in the following description.)

Combining micro elemental optical devices that have various basic functions and integrating them on a SOI substrate can produce optical circuits. Most elemental optical devices for optical circuits are made of waveguides, which makes miniaturization of the devices relatively easy. Basic elemental optical devices are optical waveguides themselves, such as linear waveguide, bent waveguide, branched waveguide. By combining a plurality of these waveguide parts, elemental optical devices such as directional couplers and interferometers can be constructed, and furthermore, by combining wavelength filters with these, elemental optical devices such as a wavelength multiplexers/demultiplexers and optical switches can be constructed.

Principal components of optical circuits are optical waveguides, but it has to be noted that cross-sectional shapes of cores of waveguides that are preferable to various optical devices are not necessarily the same. An important characteristic of optical waveguide used for optical wiring is its optical loss being small. When it is etched into its wire shape, the silicon core suffers side wall roughness, which causes optical scattering loss. Therefore, it is desirable that the height of the core of a linear waveguide is small so that the area of the walls can be small.

However, if the thickness of the core is too thin (the height is too low), mode field becomes large, which will result in increase of propagation loss rather than decrease, of a bent waveguide. Since an optical device such as directional coupler or the like includes many bent waveguides, in the case of optical circuits whose integration has to be high, a thick core is better. The thickness of a silicon active layer of an SOI substrate is uniform. Therefore, in conventional technology, considering the trade-off between reduction of optical loss and improvement of integration level of the whole optical circuit, it is necessary to select the height of the core of the waveguide of the whole optical circuit. Furthermore, the width of the core is selected so that the optical waveguide holds a single mode.

Operational characteristics of elemental optical devices depend also on direction of polarization. An optical waveguide formed on the substrate normally has waveguide modes of a TE mode, which is dominated by electrical fields with a direction parallel to the substrate and a TM mode, which is dominated by electrical fields with a direction perpendicular to the substrate, which is caused by optical symmetry of the waveguide with respect to direction of thickness and direction of width. In general, distribution of the electromagnetic field of guided light in the cross-section perpendicular to the direction of propagation, that is, mode field, differs in size and form between the TE mode and the TM mode. As a result, operational characteristics of each of the elemental optical devices in the TE mode and the TM mode differ; one may exhibit a high performance in the TE mode, and another may exhibit a high performance in the TM mode. However, in the conventional technology, since it is difficult to have direction of polarization rotate at will, there has been a problem that performance deterioration (for example, optical loss) is caused in specific elemental optical devices in an optical circuit.

Patent Document 1 discloses a converter that rotates direction of polarization continuously, and also changes the height and width of the core. However, with regard to the converter disclosed here, since core material in the form of a rectangular solid or a wedge shape is stacked up, there is a problem that it is difficult to form in a layered substrate and to continuously change cross-sectional shape of a waveguide.

[Patent Document 1]

JP Patent Kokai Publication No. JP-P2006-509264A

DISCLOSURE OF THE INVENTION

Problems to be Solved by the Invention

The matter disclosed in the abovementioned Patent Document 1 is incorporated herein by reference thereto. The following analysis is given by related technology according to the present invention. In conventional technology, when designing cross-sectional shape of a core of a waveguide, since loss reduction and improvement of level of integration of an optical circuit have a trade-off relationship, there is a problem that it is difficult to design the cross-sectional shape of the core so as to have a preferred situation for both of these at the same time.

In addition, in the conventional technology, it is necessary to limit the direction of polarization in which the optical circuit is operated to either of a TE mode or a TM mode. However, since the direction of polarization suitable for high performance and high integration depends on elemental optical devices, there is a problem that deterioration of performance (for example, an optical loss) is caused.

Furthermore, in the conventional technology, since the height of the core of the waveguide, determined according to the trade-off of the loss reduction and integration improvement, differs according to the optical circuit, it is necessary to use an SOI substrate that has a silicon active layer thickness that differs for each optical circuit. Therefore, there is a problem that manufacturing processes for the optical circuit become complicated and manufacturing cost increases.

Means to Solve the Problems

An optical circuit according to a first aspect of the present invention is provided with: a first waveguide, a second waveguide, and a third waveguide that converts mode field and direction of polarization of light of the first waveguide at the same time to perform wave guiding to the second waveguide, wherein large aspect ratio directions of corresponding ends of a core of the first waveguide and a core of the second waveguide differ from each other.

An optical circuit according to a second aspect of the present invention is provided with first to third waveguides, wherein in the first waveguide a core in a cross-section perpendicular to a waveguide axis (that is, direction of wave guiding) has a shape that is laterally long; in the second waveguide a core in a cross-section perpendicular to the waveguide axis has a shape that is vertically long in a positional relationship with the core of the first waveguide; two ends of a core of the third waveguide are connected to the core of the first waveguide and the core of the second waveguide respectively: at a connection part of the core of the first waveguide and the core of the third waveguide and a connection part of the core of the second waveguide and the core of the third waveguide, cross-sectional shape and refractive index of cores of two waveguides that are connected change continuously or in a stepwise manner; and cross-sectional shape and refractive index of the core of the third waveguide change continuously or in a stepwise manner in a direction of wave guiding between the two ends in the direction of wave guiding.

In the optical circuit of a first developed configuration, the cross-sectional shape of the core of the third waveguide changes continuously or in a stepwise manner in a direction of wave guiding.

In the optical circuit of a second developed configuration, the refractive index of the core of the third waveguide changes continuously or in a stepwise manner in a direction of wave guiding.

In the optical circuit of a third developed configuration, the direction of wave guiding of the first waveguide and the direction of wave guiding of the second waveguide are the same.

In the optical circuit of a fourth developed configuration, large aspect ratio directions of corresponding ends between the core of the first waveguide and the core of the second waveguide are orthogonal to each other.

In the optical circuit of a fifth developed configuration, the width of the core of the third waveguide, in the course from a connection end with the core of the first waveguide as far as a connection end with the core of the second waveguide, monotonically decreases or is a combination of a portion that decreases monotonically and a portion that is constant.

In the optical circuit of a sixth developed configuration, the height of the core of the third waveguide, in the course from a connection end with the core of the first waveguide to a connection end with the core of the second waveguide, monotonically increases or is a combination of a portion that increases monotonically and a portion that is constant.

In the optical circuit of a seventh developed configuration, the cross-sectional shapes of the core of the first waveguide and of the core of the second waveguide are each rectangular (with one side longer than the other side).

In the optical circuit of an eighth developed configuration, aspect ratios of cross-sectional shapes of the core of the first waveguide and the core of the second waveguide are each greater than or equal to 1.2.

In the optical circuit of a ninth developed configuration, the core of the first waveguide, the core of the second waveguide, and the core of the third waveguide are formed on the same plane.

In the optical circuit of a tenth developed configuration, length in a direction of wave guiding of the core of the third waveguide is at least 10 times the larger of the two of a difference between widths of the core of the first waveguide and the core of the second waveguide, and a difference between the height of the core of the first waveguide and the height of the core of the second waveguide.

In the optical circuit of an eleventh developed configuration, a top face of the core of the third waveguide includes an inclined plane forming an angle greater than 0 degrees and less than 90 degrees with respect to an bottom face of the core of the third waveguide, and a direction of a normal of the inclined plane projected on the bottom face forms an angle greater than 0 degrees and less than 90 degrees with respect to a direction of wave guiding of each of the first waveguide and the second waveguide.

In the optical circuit of a twelfth developed configuration, an angle formed by an inclined plane included in the core of the third waveguide and the bottom face of the core of the third waveguide is greater than or equal to 30 degrees and less than 90 degrees.

In the optical circuit of a thirteenth developed configuration, a top face of the core of the third waveguide includes a concave face, a tangential plane at an arbitrary position of the concave face forms an angle greater than 0 degrees and less than 90 degrees with the bottom face of the core of the third waveguide, and a direction of a normal of the tangential plane projected on the bottom face forms an angle greater than 0 degrees and less than 90 degrees with respect to direction of wave guiding of each of the first waveguide and the second waveguide.

In the optical circuit of a fourteenth developed configuration, refractive indices of the cores of the first waveguide, the second waveguide, and the third waveguide are greater than or equal to 3, and the refractive index of cladding is less than or equal to 2.

In the optical circuit of a fifteenth developed configuration, the first waveguide, the second waveguide, and the third waveguide are formed on a single SOI (Silicon on Insulator) substrate.

An optical circuit according to a third aspect of the present invention is provided with a first waveguide and a second waveguide, and is provided with, in series, a third waveguide, between the first waveguide and the second waveguide, for performing polarization rotation and mode field conversion at the same time, and a fourth waveguide for performing mode field conversion only, and conversion is performed reciprocally between a TE mode and a TM mode.

In the optical circuit of a sixteenth developed configuration, the fourth waveguide is connected to a waveguide whose aspect ratio is 1 and to a waveguide whose aspect ratio is not 1, or connects waveguides whose large aspect ratio directions are different from each other.

The optical circuit of a seventeenth developed configuration is provided with the third waveguide and the fourth waveguide in series.

An optical circuit according to a fourth aspect of the present invention is provided with: a third waveguide, arranged between a first waveguide and a second waveguide, for converting mode field and direction of polarization of light of the first waveguide at the same time to perform wave guiding to the second waveguide, wherein a cross-sectional shape of a core of the third waveguide changes continuously or in a stepwise manner in a direction of wave guiding, and large aspect ratio directions of corresponding ends of a core of the first waveguide and a core of the second waveguide differ from each other.

In the optical circuit of an eighteenth developed configuration, in a connection part of the core of the first waveguide and the core of the third waveguide, and in a connection part of the core of the second waveguide and the core of the third waveguide, cross-sectional shapes and refractive indices of two waveguides that are connected preferably change continuously or in a stepwise manner.

A method of manufacturing an optical circuit according to a fifth aspect of the present invention includes a step of forming a waveguide by fabricating such that, for core materials having a first film with a constant film thickness, a second film with a constant film thickness thinner than the first film, and a third film that is in contact with the two films at an equal thickness for each and whose film thickness changes monotonically in one direction, a core longitudinal direction has a direction that obliquely intersects the third film with a direction in which the film thickness of the third film changes.

The method of manufacturing an optical circuit of a nineteenth developed configuration, in a formation step of fabricating the third film in a wire shape, includes a step of fabricating the third film such that core width decreases monotonically in a direction in which thickness goes from being small to being large, or, of fabricating to combine a portion that decreases monotonically and a constant portion.

In the method of manufacturing the optical circuit of a twentieth developed configuration, the waveguide is formed on a single SOI substrate.

Meritorious Effects of the Invention

According to the polarization rotator of the present invention, it is possible to change the height of a core of a waveguide at will. Therefore, it is possible to mix elemental optical devices that have different core heights within an optical circuit. As a result, it is possible to eliminate a trade-off relationship between the loss reduction and the improvement of integration, with regard to the height of the waveguide core, and to realize the loss reduction and the improvement of integration in the optical circuit.

In addition, according to the polarization rotator of the present invention, it is possible to change the direction of polarization at will. Therefore, it is possible to mix elemental optical devices that have different capabilities according to the direction of polarization, within the optical circuit.

Furthermore, since a method of manufacturing the polarization rotator of the present invention or an optical circuit including the same can be realized on a single SOI substrate, a process of manufacturing the optical circuit is simplified, and also is realized at low cost.

Figure 1:
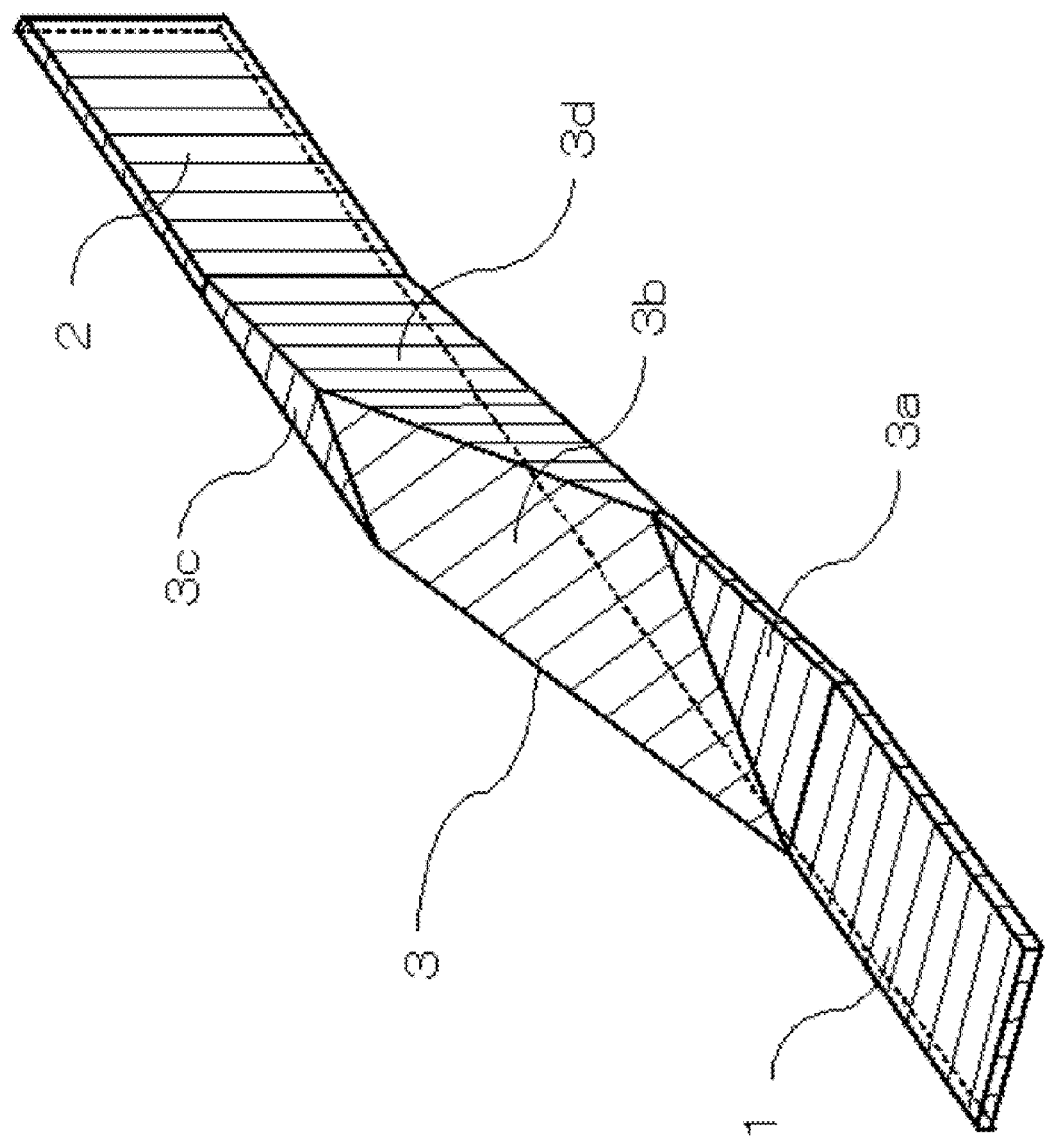
FIG. 1 is a perspective view for describing an optical circuit of a first exemplary embodiment of the present invention.

EXPLANATIONS OF SIGNS 1 core of first waveguide
2 core of second waveguide
3 core of third waveguide
3a top face of core of third waveguide, formed of lower portion of tapered step
3b top face of core of third waveguide, formed of slope with tapered step
3c top face of core of third waveguide, formed from higher portion of tapered step
3d side face of core of third waveguide
4 tapered step having slope with plane face
5 core material (silicon active layer)
6 cladding material (silicon dioxide thin film)
7 core of third waveguide
7a top face of core of third waveguide, formed of lower portion of tapered step
7b top face of core of third waveguide, formed of slope with tapered step
7c top face of core of third waveguide, formed from high portion of tapered step
7d side face of core of third waveguide
8 core of third waveguide
8a top face of third waveguide, formed of slope with tapered step having concave face
8b top face of core of third waveguide, formed of higher portion of tapered step
8c side face of core of third waveguide
9 tapered step having slope with concave face

PREFERRED MODES FOR CARRYING OUT THE INVENTION

An optical circuit according to an embodiment of the present invention is provided with first to third waveguides, wherein in the first waveguide a shape of a core in a cross-section perpendicular to a direction of wave guiding is laterally long; in the second waveguide a shape of a core in a cross-section perpendicular to a direction of wave guiding is vertically long in a positional relationship with the core of the first waveguide; two ends of a core of the third waveguide are connected to the core of the first waveguide and the core of the second waveguide respectively; at each of connection part of the core of the first waveguide and the core of the third waveguide, and a connection part of the core of the second waveguide and the core of the third waveguide, cross-sectional shapes and refractive indices of cores of two waveguides that are connected change continuously or in a stepwise manner, and cross-sectional shape and refractive index of the core of the third waveguide change continuously or in a stepwise manner in a direction of wave guiding between the two ends in a direction of wave guiding.

In addition, a direction of wave guiding of the core of the first waveguide and a direction of wave guiding of the core of the second waveguide may be parallel.

Furthermore, a width of a core in the cross-section perpendicular to the direction of wave guiding of the core of the third waveguide, in the course from a connection end with the core of the first waveguide to a connection end with the core of the second waveguide, may monotonically decrease or may be a combination of a portion that decreases monotonically and a portion that is constant.

Furthermore, the height of a core in the cross-section perpendicular to the direction of wave guiding of the core of the third waveguide, in the course from a connection end with the core of the first waveguide to a connection end with the core of the second waveguide, may monotonically increase or may be a combination of a portion that increases monotonically and a portion that is constant.

Furthermore, the cross-sectional shapes of the core of the first waveguide and of the core of the second waveguide are each rectangular.

Furthermore, the longer of vertical-lateral ratio of the cross-sectional shapes of each of the core of the first waveguide and the core of the second waveguide is preferably greater than or equal to 1.2 times the shorter thereof.

Furthermore, bottom faces of the core of the first waveguide, the core of the second waveguide, and the core of the third waveguide are all preferably on the same plane.

In addition, the length of the core of the third waveguide is preferably at least 10 times the larger of: a difference between the width of the core of the first waveguide and the width of the core of the second waveguide, and a difference between the height of the core of the first waveguide and the height of the core of the second waveguide.

Moreover, a top face of the core of the third waveguide may include an inclined plane forming an angle between 0 degrees and 90 degrees with an bottom face of the core of the third waveguide, and a direction of a normal of the inclined plane projected on the bottom face may form an angle between 0 degrees and 90 degrees with respect to both the direction of wave guiding of the core of the first waveguide and the direction of wave guiding of the core of the second waveguide.

Furthermore, an angle formed by an inclined plane with the bottom face of the core of the third waveguide may be greater than or equal to 30 degrees and less than 90 degrees.

Furthermore, a top face of the core of the third waveguide may include a concave face; a tangential plane with respect to an arbitrary position of the concave face may form an angle between 0 degrees and 90 degrees with the bottom face of the core of the third waveguide; and a direction of a normal of the tangential plane projected on the bottom face may form an angle between 0 degrees and 90 degrees with respect to a direction of wave guiding of both the core of the first waveguide and the core of the second waveguide.

In addition, the direction of wave guiding of the core of the first waveguide and the direction of wave guiding of the core of the second waveguide need not be parallel.

Moreover, refractive indices of the cores are preferably greater than or equal to 3, and the refractive index of cladding is preferably less than or equal to 2.

In addition, a TE-TM mode converter may have a function for reciprocally converting a polarization mode of a waveguide between a TE mode and a TM mode, and may be provided with a mode-field converter and the abovementioned polarization rotator.

Furthermore, in the TE-TM mode converter, the mode-field converter may convert a TE mode and a TM mode of flat waveguides having cores in which vertical and lateral aspects are equal or which are long laterally, to a TE mode and a TM mode of flat waveguides respectively having cores which are vertically long, or may perform conversion that is the reverse thereof.

In addition, in the TE-TM mode converter, the mode-field converter may convert a TE mode and a TM mode of flat waveguides having cores that are laterally long, to a TE mode and a TM mode of flat waveguides having cores in which vertical and lateral aspects are equal or which are long vertically, respectively, or may perform conversion that is the reverse thereof.

Moreover, the TE-TM mode converter is preferably configured by the mode-field converter and the polarization rotator being connected in series.

A method of manufacturing the polarization rotator according to another embodiment of the present invention includes a step of fabricating core material, which has a configuration in which a thick film portion and a thin film portion are adjacent via a tapered step in a direction of thickness, in a wire shape extending in a direction with the tapered step cut laterally and obliquely.

Furthermore, in a range in which the tapered step is cut laterally, fabricating may be performed so that the width of the wires decreases monotonically in a direction from where the step is low towards where the step is high, or fabricating may be performed to have a combination of a portion that decreases monotonically and a portion that is constant.

Exemplary Embodiment 1

Next, a detailed description is given concerning a first exemplary embodiment of the present invention, making reference to the drawings.

Figure 2:
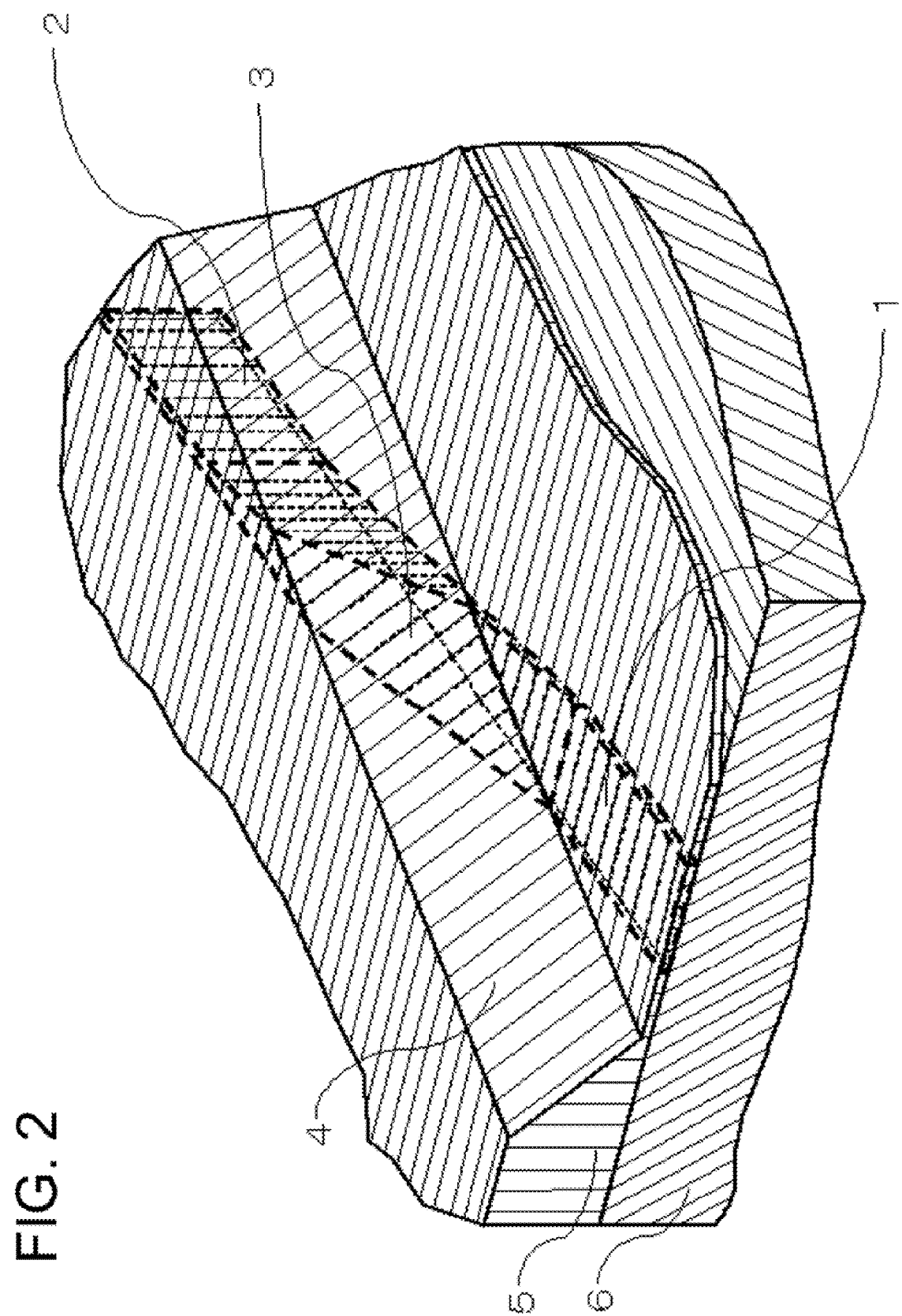
FIG. 2 is a perspective view of an SOI substrate for describing a method of manufacturing the optical circuit of the first exemplary embodiment of the present invention.

FIG. 1 is a perspective view for describing an optical circuit of a first exemplary embodiment of the present invention. Furthermore, FIG. 2 is a perspective view of a substrate in order to describe a method of manufacturing the optical circuit of the first exemplary embodiment of the present invention.

The optical circuit, which is provided with waveguides in which core height and polarization direction are different from each other, can be realized on a single SOI substrate, by using a polarization rotator having a core form as shown in FIG. 1.

The polarization rotator is provided with a first waveguide, a second waveguide, and a third waveguide, and is characterized in that a core 1 of the first waveguide has a shape that is laterally long; a core 2 of the second waveguide has a shape that is vertically long; two ends of a core 3 of the third waveguide are connected to the core 1 of the first waveguide and the core 2 of the second waveguide respectively; at a connection part of the core 1 of the first waveguide and the core 3 of the third waveguide and a connection part of the core 2 of the second waveguide and the core 3 of the third waveguide, the cross-sectional shapes and refractive indices of cores of two waveguides that are connected change continuously or in a stepwise manner, and the cross-sectional shape and refractive index of the core of the third waveguide changes continuously or in a stepwise manner between the two ends.

The third waveguide is a waveguide in which width and height of the waveguide gradually change, and is an elemental optical device (that is, a polarization rotator) for rotating polarization and connecting waveguides with cores of different heights. By the height of the core being changed gradually (continuously or in a stepwise manner), it is possible to couple waveguides having different core heights, with low loss. In addition, by gradually changing the core width asymmetrically, it is possible to couple single mode waveguides of different polarization directions, on two sides of the polarization rotator, with no loss.

Moreover, directions of wave guiding of the first waveguide and the second waveguide may be the same.

A top face of the core 3 of the third waveguide is formed from a top face 3a of a lower portion of a tapered step of core material 5 shown in FIG. 2, an inclined plane 3b of the tapered step, and a top face 3c of a high portion of the tapered step. Two side faces 3d of the core 3 of the third waveguide are defined as being faces orthogonal to parts 3a and 3c of the bottom and top faces of the core 3.

The width between the two side faces 3d of the core 3 of the third waveguide, in the course from a connection end with the core 1 of the first waveguide to a connection end with the core 2 of the second waveguide, may monotonically decrease or may be a combination of a portion that decreases monotonically and a portion that is constant.

In addition, the height of the core of the third waveguide, in the course from a connection end with the core 1 of the first waveguide to a connection end with the core 2 of the second waveguide, may monotonically increase or may be a combination of a portion that increases monotonically and a portion that is constant.

Cross-sectional shapes of the core 1 of the first waveguide and the core 2 of the second waveguide are each preferably rectangular.

The longer of a vertical-lateral ratio of the cross-sectional shapes of each of the core 1 of the first waveguide and the core 2 of the second waveguide may be greater than or equal to 1.2 times the shorter thereof.

The bottom faces of the core 1 of the first waveguide, the core 2 of the second waveguide, and the core 3 of the third waveguide are all preferably on the same plane.

The length of the direction of wave guiding of the third waveguide is preferably at least 10 times the larger of: a difference between the width of the core 1 of the first waveguide and the width of the core 2 of the second waveguide, and a difference between the height of the core 1 of the first waveguide and the height of the core 2 of the second waveguide.

A top face of the core 3 of the third waveguide may include an inclined plane 3b forming an angle between 0 degrees and 90 degrees with an bottom face of the core 3 of the third waveguide; and a direction of a normal of the inclined plane 3b projected on the bottom face may form an angle greater than 0 degrees and less than 90 degrees with respect to both the direction of wave guiding of the core 1 of the first waveguide and the direction of wave guiding of the core 2 of the second waveguide.

An angle formed by the inclined plane 3b with the bottom face of the core 3 of the third waveguide is preferably greater than or equal to 30 degrees and less than 90 degrees.

Moreover, the refractive index of the core is preferably greater than or equal to 3, and the refractive index of the cladding is preferably less than or equal to 2.

A manufacturing method of the first exemplary embodiment is described, making reference to the drawings.

For a core material (silicon active layer) 5 provided with a step structure in which a thick film and a thin film are connected via a taper in a direction of thickness, it is possible to produce a polarization rotator by forming a core of a waveguide in a wire shape in a direction cut laterally and obliquely to a step direction. Here, "a step direction" indicates a direction in which a normal of a top face of the step is projected on the bottom face. Furthermore, "a direction cut laterally and obliquely to a step direction", within a plane parallel to an SOI film, indicates a direction that is neither parallel to nor perpendicular to a step direction (that is, within a plane parallel to an SOI film, a direction intersecting at an angle outside of 0 degrees and 90 degrees to the step direction). Therefore, "forming a core of a waveguide in a wire shape in a direction cut laterally and obliquely to a step direction" indicates forming a core such that a longitudinal direction of the core (under normal conditions, matching the direction of wave guiding) has this type of oblique direction.

Furthermore, in order to form a taper in a direction of width, the polarization rotator may be formed, with regard to a range in which the step is laterally cut, by fabricating such that the width between the two side faces (3b in FIG. 1) of the core of the third waveguide, in a direction from the step being low to being high, decreases monotonically, or so as to have a combination of a portion that decreases monotonically and a portion that is constant.

Exemplary Embodiment 2

A description is given concerning a second exemplary embodiment of the present invention, making reference to the drawings.

Figure 3:
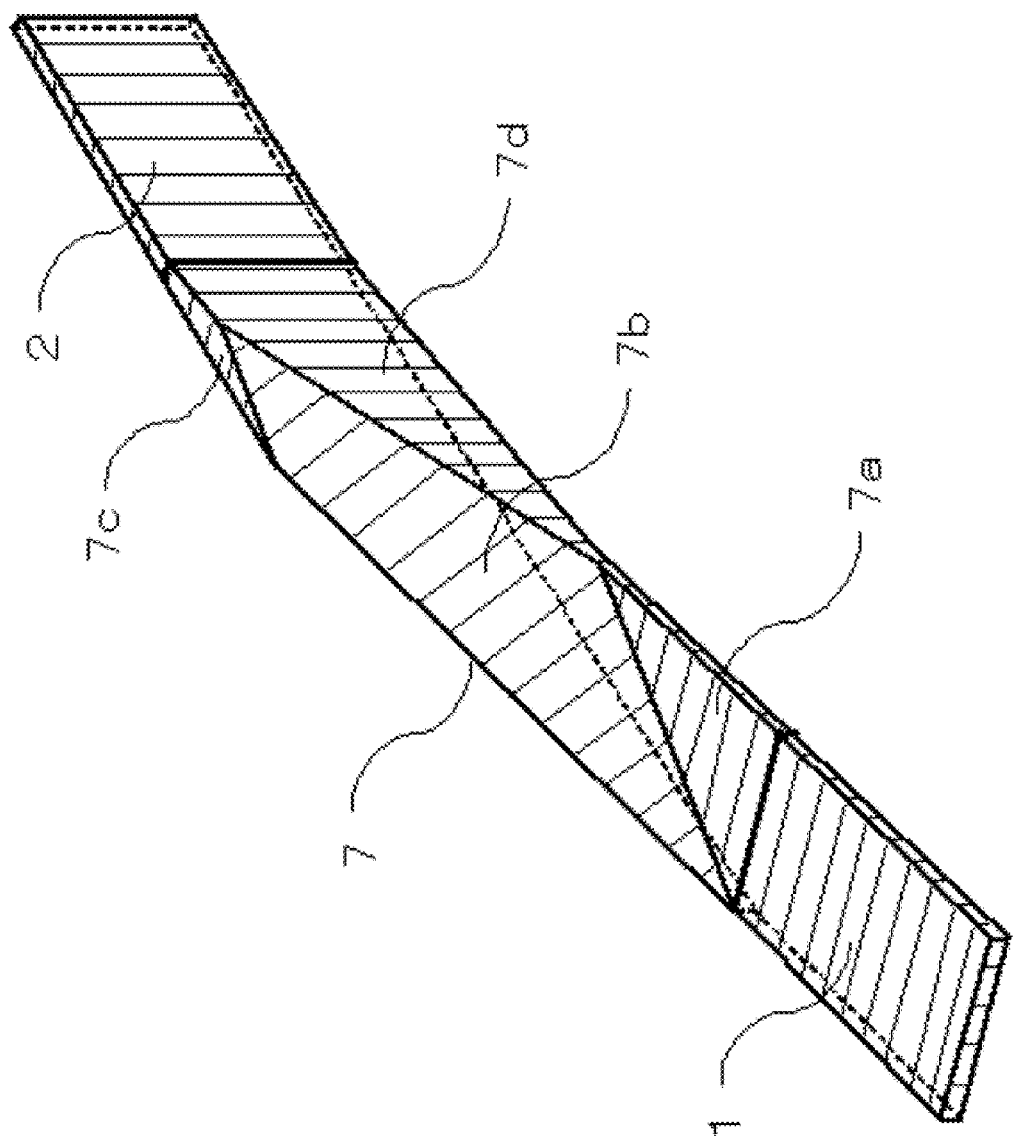
FIG. 3 is a perspective view for describing an optical circuit of a second exemplary embodiment of the present invention.

FIG. 3 is a perspective view for describing an optical circuit of the second exemplary embodiment of the present invention.

In the first exemplary embodiment, as shown in FIG. 1, the direction of wave guiding of a first waveguide and the direction of wave guiding of a second waveguide were parallel to each other, but, as shown in FIG. 3, these need not be parallel to each other. That is, the direction of wave guiding of the first waveguide and the direction of wave guiding of the second waveguide may be determined so as to match the direction of wave guiding of light passing through a core 7 of a third waveguide. Therefore, as shown in FIG. 3, the direction of wave guiding of a core 1 of the first waveguide and the direction of wave guiding of a core 2 of the second waveguide need not be parallel.

Exemplary Embodiment 3

A description is given concerning a third exemplary embodiment of the present invention, making reference to the drawings.

Figure 4:
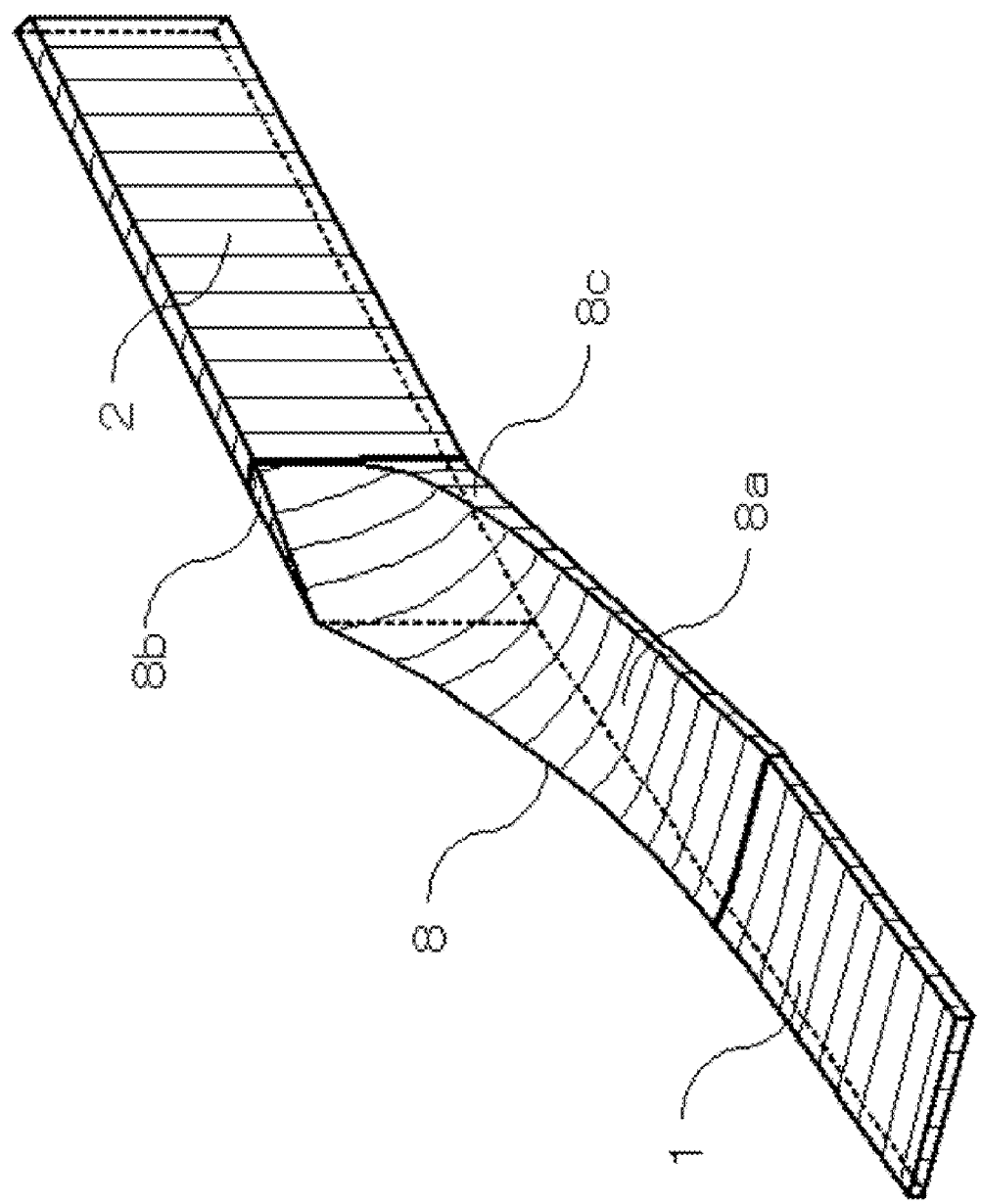
FIG. 4 is a perspective view for describing an optical circuit of a third exemplary embodiment of the present invention.
Figure 5:
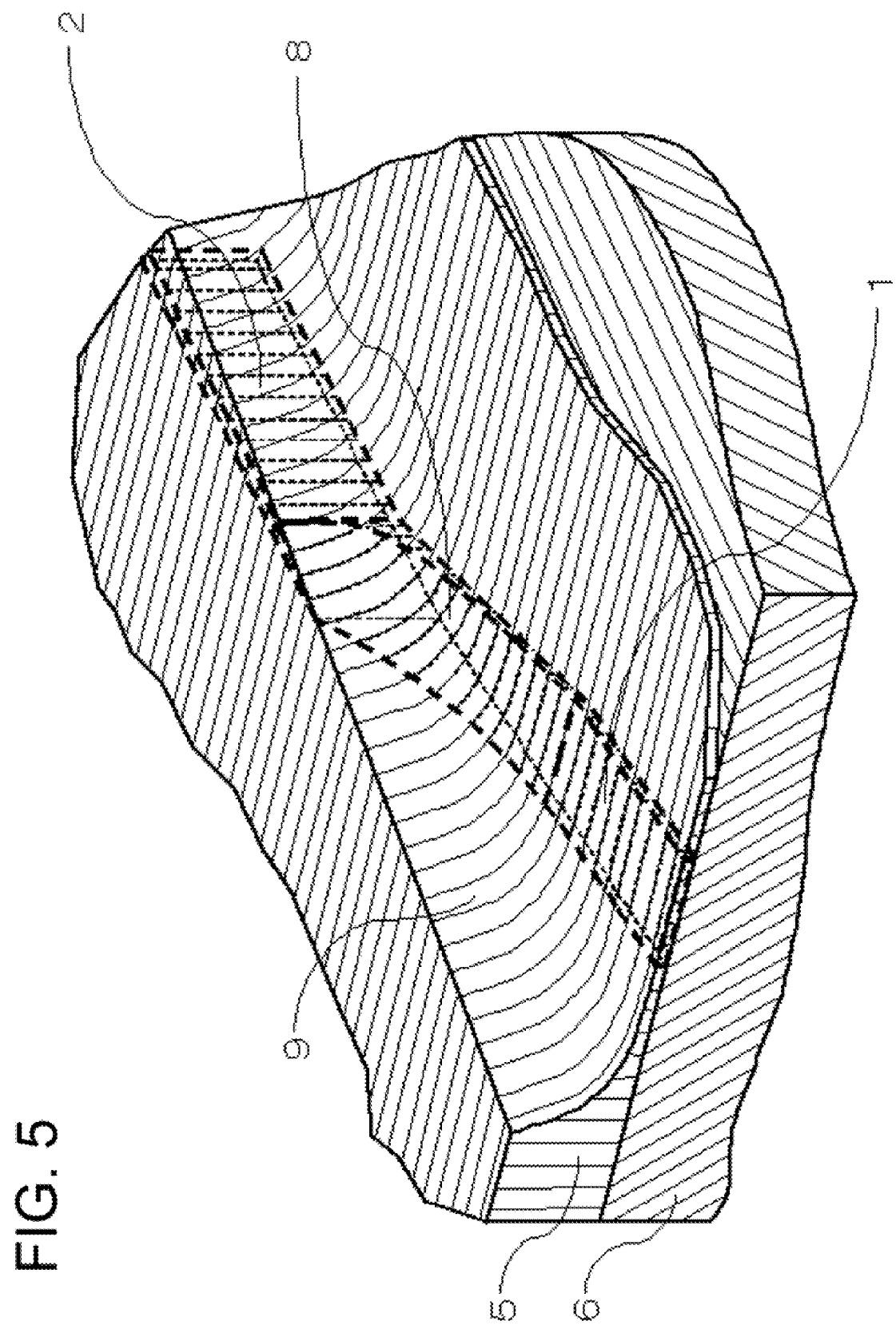
FIG. 5 is a perspective view of an SOI substrate for describing a method of manufacturing the optical circuit of the third exemplary embodiment of the present invention.

FIG. 4 is a perspective view for describing an optical circuit of the third exemplary embodiment of the present invention. FIG. 5 is a perspective view of an SOI substrate for describing a method of manufacturing the optical circuit of the third exemplary embodiment of the present invention.

In the description of exemplary embodiments 1 and 2, a description was given in which the top faces 3a to 3c and 7a to 7c of a core 3 of a third waveguide in FIG. 1 and FIG. 3 were all planes. However, in order to further improve efficiency in rotating polarized light, it is preferable that a polarization rotator should include a curved face as shown in FIG. 4. That is, a top face of a core 8 of the third waveguide may include a concave face 8a; a tangential plane with respect to an arbitrary position of the concave face 8a may form an angle greater than 0 degrees and less than 90 degrees with an bottom face of the core 8 of the third waveguide; and a direction of a normal of the tangential plane projected on the bottom face may form an angle greater than 0 degrees and less than 90 degrees with respect to each of the direction of wave guiding of a core 1 of a first waveguide and the direction of wave guiding of a core 2 of a second waveguide.

By combining the polarization rotator and a mode-field converter in which polarized light is not rotated, it is possible to configure a TE-TM mode converter. That is, the mode-field converter and the polarization rotator are provided, and the TE-TM mode converter is provided, which has a function for reciprocally converting a polarization mode of a waveguide having a TE-mode and a TM-mode polarization mode, between the TE mode and the TM mode.

The mode-field converter may convert a TE mode and a TM mode of flat waveguides having cores whose vertical/lateral aspects are equal or which are long laterally, to a TE mode and a TM mode of flat waveguides that each have a core which is vertically long, or may perform conversion that is the reverse thereof.

Furthermore, the mode-field converter may convert a TE mode and a TM mode of flat waveguides having cores that are long laterally, to a TE mode and a TM mode of flat waveguides that each have a core in which vertical and lateral aspects are equal or which is vertically long, or may perform conversion that is the reverse thereof.

A simplest TE-TM mode converter is provided with a configuration in which the mode-Field converter and the polarization rotator are connected in series.

In cases of implementing a manufacturing method according to the present invention, as one example, an arrangement may be envisaged in which an SOI substrate is used and a silicon active layer thereof is used as a core of a waveguide. By patterning with a photoresist on the silicon active layer of the SOI substrate and etching using potassium hydroxide solution, a tapered step 4 of 45 degrees is formed, as shown in FIG. 2. After delamination of the photoresist, by forming a wire pattern for a waveguide in a direction with the step 4 newly cut laterally and obliquely, and fabricating in a wire shape by anisotropic dry etching, it is possible to form the polarization rotator that is provided with cores 1 to 3 of waveguides shown by wavy lines in FIG. 2.

Furthermore, in the case of using a mixture of nitric acid and hydrogen peroxide as a solution for forming the step in the silicon active layer, since isotropic etching occurs, it is possible to form a tapered step 9 having an inclined plane with a concave shape as shown in FIG. 5. By forming the wire pattern for the waveguides for a direction so as to cut the tapered step 9 laterally and obliquely, to fabricate in a wire shape by anisotropic dry etching, it is possible to form the polarization rotator that is provided with cores 1, 2 and 8 of the waveguides, as shown by the broken lines of FIG. 5.

INDUSTRIAL APPLICABILITY

According to an optical circuit of the present invention, it is possible to realize a high performance optical circuit in which elemental optical devices of different heights or polarization directions are integrated.

Modifications and adjustments of embodiments and examples are possible within the bounds of the entire disclosure (including the scope of the claims) of the present invention, and also based on fundamental technological concepts thereof. Furthermore a wide variety combinations and selections of various disclosed elements are possible within the scope of the claims of the present invention.

What is claimed is:

1. An optical circuit comprising:
a first waveguide;
a second waveguide; and
a third waveguide that converts mode field and direction of polarization of light of said first waveguide to perform wave guiding to said second waveguide,
wherein large aspect ratio directions of corresponding ends of a core of said first waveguide and a core of said second waveguide differ from each other,
and wherein said refractive index of said core of said third waveguide changes continuously or in a stepwise manner in a direction of wave guiding.

2. An optical circuit comprising:
a first waveguide;
a second waveguide; and
a third waveguide that converts mode field and direction of polarization of light of said first waveguide to perform wave guiding to said second waveguide,
wherein large aspect ratio directions of corresponding ends of a core of said first waveguide and a core of said second waveguide differ from each other,
and wherein length in a direction of wave guiding of said core of said third waveguide is at least 10 times the larger of: a difference between widths of said core of said first waveguide and said core of said second waveguide, and a difference between said height of said core of said first waveguide and said height of said core of said second waveguide.

3. An optical circuit comprising:
a first waveguide;
a second waveguide; and
a third waveguide that converts mode field and direction of polarization of light of said first waveguide to perform wave guiding to said second waveguide,
wherein large aspect ratio directions of corresponding ends of a core of said first waveguide and a core of said second waveguide differ from each other,
and wherein an angle formed by an inclined plane included in said core of said third waveguide and said bottom face of said core of said third waveguide is greater than or equal to 30 degrees and less than 90 degrees.

4. An optical circuit comprising:
a first waveguide;
a second waveguide; and
a third waveguide that converts mode field and direction of polarization of light of said first waveguide to perform wave guiding to said second waveguide,
wherein large aspect ratio directions of corresponding ends of a core of said first waveguide and a core of said second waveguide differ from each other,
and wherein
refractive indices of said cores of said first waveguide, said second waveguide, and said third waveguide are greater than or equal to 3, and
a refractive index of cladding is less than or equal to 2.

5. An optical circuit comprising:
a first waveguide;
a second waveguide; and
a third waveguide that converts mode field and direction of polarization of light of said first waveguide to perform wave guiding to said second waveguide,
wherein large aspect ratio directions of corresponding ends of a core of said first waveguide and a core of said second waveguide differ from each other,
and wherein said first waveguide, said second waveguide, and said third waveguide are formed on a single Silicon on Insulator (SOI) substrate.

6. An optical circuit comprising:
a first waveguide; and
a second waveguide; and further comprising:
in series, a third waveguide, between said first waveguide and said second waveguide, for performing polarization rotation and mode field conversion; and a fourth waveguide for performing mode field conversion only; wherein conversion is performed reciprocally between a TE mode and a TM mode.

7. The optical circuit according to claim 6, wherein said fourth waveguide is connected to a waveguide in which an aspect ratio of a corresponding end is 1 and to a waveguide in which an aspect ratio of a corresponding end is not 1, or connects waveguides whose large aspect ratio directions are different from each other.

8. The optical circuit according to claim 6, wherein said third waveguide and said fourth waveguide are arranged in series.

\* \* \* \* \*